United States Patent [19]
Tung

[11] Patent Number: 5,854,638
[45] Date of Patent: Dec. 29, 1998

[54] UNIFIED MEMORY ARCHITECTURE WITH PARALLEL ACCESS BY HOST AND VIDEO CONTROLLER

[75] Inventor: Hsu-Tien Tung, San Jose, Calif.

[73] Assignee: OPTi Inc., Milpitas, Calif.

[21] Appl. No.: 595,852

[22] Filed: Feb. 2, 1996

[51] Int. Cl.[6] .................................................. G06F 15/167
[52] U.S. Cl. .......................... 345/512; 345/521; 345/515; 395/306
[58] Field of Search ..................................... 395/512, 521, 395/501, 502, 507–509, 515, 306, 308; 345/185, 189, 201, 203, 512, 520, 521, 501, 502, 507–509, 515

[56] References Cited

U.S. PATENT DOCUMENTS

| 5,241,631 | 8/1993 | Smith et al. | 395/325 |
| 5,450,542 | 9/1995 | Lehman et al. | 395/520 |
| 5,454,107 | 9/1995 | Lehman et al. | 395/480 |
| 5,502,808 | 3/1996 | Goddard et al. | 345/185 |
| 5,553,220 | 9/1996 | Keene | 345/203 |
| 5,659,715 | 8/1997 | Wu et al. | 345/507 |
| 5,682,522 | 10/1997 | Huang et al. | 345/512 |

OTHER PUBLICATIONS

PCI Special Interest Group, "PCI Local Bus Specification", Revision 2.0 (Apr. 30, 1993).
Quality Semiconductor, Inc., "High–Speed CMOS Quick-Switch® Bus Switches with Series Resistors", QS32245 Advance Information, MDSL–00113–00 (1994), pp. 4–11.
Samsung Electronics Co. Ltd., "KMM536000AH Fast Page Mode DRAM Module", Datasheet (1994), pp. 251–256.
Video Electronics Standards Association, "VESA VL–Bus™ Local Bus Standard", Rev. No. 1.0 (Aug. 28, 1992).
PCI Special Interest Group, "PCI Local Bus Specification", Rev. 2.1 (Jun. 1, 1995).

Primary Examiner—Kee M. Tung
Attorney, Agent, or Firm—Fliesler Dubb Meyer & Lovejoy LLP

[57] ABSTRACT

In a unified memory computer system architecture, the unified memory is divided into at least two banks of memory. All but one of the memory banks is reserved for access exclusively by the host memory controller, and only one bank of memory is shared between the host memory controller and the video controller. Host accesses to the non-shared bank of the unified memory can take place concurrently with video controller accesses to the shared bank of memory.

18 Claims, 6 Drawing Sheets

UNIFIED MEMORY ARCHITECTURE WITH PARALLEL ACCESS BY HOST AND VIDEO CONTROLLER

BACKGROUND

1. Field of the Invention

The invention relates to techniques for sharing memory in a personal computer unified memory architecture, and more specifically to a technique for shared control of a memory that is shared by at least a host processor and a video controller.

2. Description of Related Art

In a typical IBM PC/AT-compatible computer system, a host processor such as an Intel Pentium processor is coupled to a host bus and, via a host memory controller, to main memory. The host bus is also coupled via an I/O bridge to an I/O bus, such as an ISA (Industry Standard Architecture) bus. Various peripheral devices are connected to the ISA bus, including a video controller.

The video controller is coupled to the display, and also to its own bank of display memory, also called video memory. The display memory is typically on the order of one or two megabytes, although the standard PC/AT architecture allocates only 128 k bytes (at addresses A0000-BFFFF). Therefore, in order to access (read or write) the full amount of display memory, the host processor first must program a register in the video controller to indicate which 128 k-byte segment of display memory is to appear through the 128 k-byte window allocated by the system architecture. When the host processor actually performs the access, the I/O bridge recognizes that the access is to an address within the 128 k-byte window, and translates the access onto the ISA bus. The video controller recognizes the address, and translates it into the currently selected 128 k-byte segment of the display memory. Only then is the access finally made to the display memory.

Various improvements have been made to the standard architecture in order to speed up accesses to video memory. One such improvement is known as the VESA (Video Electronics Standards Association) local bus or VL-Bus standard, and is defined in VESA, "VESA VL-Bus Local Bus Standard", Revision 1.0 (1992), incorporated herein by reference. In systems which use this standard, the control, address and data leads of the host bus are monitored by the video controller. When the video controller recognizes an access to the 128 k-byte video memory address window, it asserts a "local device" signal to the I/O bridge and responds directly to the cycle on the host bus. Although access to the video controller in the I/O address space continue to take place via the I/O bridge and the ISA bus, accesses to memory bypass the bridge and avoid its inherent delays.

In another such improvement, the video controller is connected to a "mezzanine" bus, such as a PCI (Peripheral Components Interconnect) bus, rather than the ISA bus. The PCI-bus standard is defined in Intel Corp., "Peripheral Component Interconnect (PCI), revision 1.0 Specification" (Jun. 22, 1992), in PCI Special Interest Group, "PCI Local Bus Specification", Revision 2.0 (Apr. 30, 1993), and in PCI Special Interest Group, "PCI Local Bus Specification", Rev. 2.1 (Jun. 1, 1995), all incorporated herein by reference. Like the ISA bus, a PCI bus is coupled to the host bus via an I/O bridge. Unlike the ISA bus, however, the PCI bus is extremely fast. All accesses to the video controller, both in its I/O address space and in its memory address space, take place via the PCI bus.

In a yet another improvement, yet another architecture has been proposed. In this architecture, known as a "unified memory" architecture, display memory is mapped to a region of the same physical DRAM chips which contain the host memory. For example, in a 16-megabyte system, the first 14 megabytes might be allocated for the host memory address space, and the high order two megabytes might be allocated for the display memory address space. 16 megabytes of physical memory can be provided, with a full 64-bit data path, using two banks of 16 parallel 4-megabit DRAMs each (each DRAM organized as one megabit by 4 bit).

A video controller typically accesses display memory for two purposes: processing of graphics commands received by the video controller via its address ports in the I/O address space, and for refreshing the display from the frame buffer. Accesses for the former purpose can be read or write accesses, whereas accesses for the latter purpose are read only. The reading of frame buffer data to refresh the display is performed via a first-in-first-out (FIFO) buffer/shift register, and therefore can tolerate some latency in its access to DRAM if the FIFO is still mostly full. However, if the FIFO is nearly empty, then a low latency access to the frame buffer is essential. Therefore, in a typical unified memory architecture, the video controller arbitrates with the host for access to the common memory using two priority levels: the video controller would issue a low priority request when the FIFO level falls to a "high water mark", and if the FIFO level falls to a "low water mark" before the request has been granted, then the video controller would issue a high priority request for access to the DRAM. The video controller usually issues low priority requests when it needs access to the DRAM to process graphics commands.

While the concept of the unified memory architecture has merit, significant problems arise in practical implementation. In particular, it appears that the video controller's high priority demands for filling its display output FIFO appear to starve the host processor of the cycles which the host processor needs in order to continue executing instructions. This competition is so severe that the processor's performance degrades to a point at which it becomes virtually impractical to build a commercially viable computer system using the concept of a unified memory architecture. Accordingly, there is an urgent need for a way to implement a unified memory architecture which does not significantly degrade the performance of the host processor.

SUMMARY OF THE INVENTION

The invention comprises a technique for implementing the unified memory architecture in systems in which the unified memory is divided into at least two banks of memory. According to the invention, roughly described, all but one of the memory banks is reserved for access exclusively by the host processor, and only one bank of memory is shared between the host processor and the video controller. In a two-bank, 16-megabyte system (eight megabytes per bank), for example, the highest one-, two- or four-megabyte region of memory is reserved for the video controller, whereas the remainder of the memory space is available to the host processor. In this example, only those accesses by the host processor to memory addresses which are located above eight megabytes require arbitration. All host processor accesses to the low eight megabytes of memory take place without any requirement for arbitration with the video controller. In an aspect of the invention, host processor accesses to the non-shared portion of the unified memory can take place concurrently with video controller accesses to the shared portion of memory.

The placement of video memory in the highest bank of the unified memory is advantageous because several of the most popular personal computer operating systems presently in use (DOS, Windows 3.1, and Windows '95) all tend to use low memory for storing programs and data, gradually filling memory toward the high end. Thus, systems running these operating systems will see no degradation in processor performance until memory has been filled beyond the low banks and into the bank which also contains the video memory. It will be understood, however, that other operating systems may fill memory in a different sequence, in which case it may be advantageous to place the video memory in a bank other than the highest bank of memory.

BRIEF DESCRIPTION OF THE DRAWINGS

The invention will be described with respect to particular embodiments thereof, and reference will be made to the drawings, in which.

DETAILED DESCRIPTION

I. HARDWARE ARCHITECTURE

Figure 1:
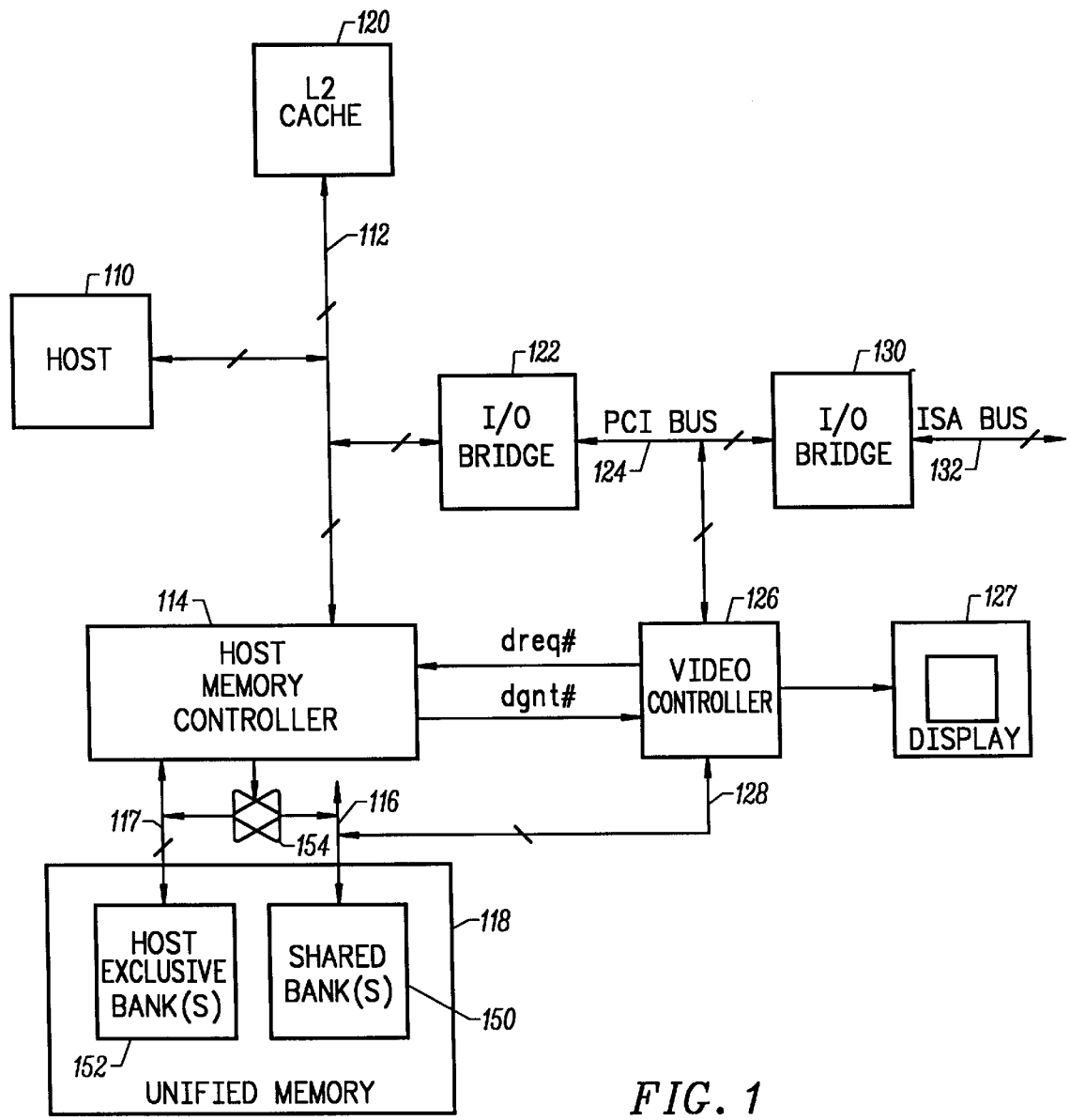
FIG. 1 is an overall block diagram of a computer system incorporating the invention.

FIG. 1 is an overall block diagram of a computer system incorporating the invention. It comprises a host 110, which may be a Pentium processor manufactured by Intel Corporation, Santa Clara, Calif.

The host 110 is connected to a host bus 112, which includes control lines, address lines, and 64 bits of data lines (not shown individually in FIG. 1). The host bus 112 is connected via a host memory controller (HMC) 114 to a host memory bus 117, which also includes address, data and control lines (not shown individually in FIG. 1). The host memory bus 117 is connected further to the unified memory 118.

The unified memory 118 includes more than one bank of memory and, for example, is made up of two banks of 16 parallel 4-megabit DRAMs, for a total memory capacity of 16 megabytes, and a total data path width of 64 bits. The DRAM can be standard DRAM, fast-page DRAM, EDO DRAM, synchronous DRAM (SDRAM), burst EDO DRAM, BEDO DRAM, or some other type of memory. In this two-bank example, the bank containing the high-half of physical memory address space is referred to as shared bank 150, and the bank containing the low-half of physical memory address space is referred to as host exclusive bank 152. Host memory bus 117 is connected only to the host exclusive bank(s) 152, and not to the shared bank(s) 150. In addition, the unified memory 118 has a separate shared memory bus 116 which is connected only to the shared bank(s) 150. A set of transmission gates 154 are further provided so that under control of the host memory controller 114, the two memory buses 116 and 117 can be placed in communication with each other, thereby allowing the host memory controller to access the shared bank(s) 150 only at desired times.

As used herein, a bank of memory is a group of one or more memory chips which are arranged to span the entire width of a data bus, and to span a contiguous range of physical address space. Usually, as in the above two-bank example, a bank of memory is made up of a number of memory chips all arranged in parallel across the width of the data bus, and each chip spanning the entire physical address range of the bank; however, none of these conditions are requirements.

The host bus 112 is also connected to an optional level 2 (L2) cache memory 120, which for the purposes of the present embodiment, can equivalently be considered part of the Host 110. The host bus 112 communicates further via an I/O bridge 122 to a PCI bus 124. The PCI bus 124 conforms to the above-incorporated PCI-bus 2.1 specification. Several different devices are connected to the PCI bus 124, one of which is a video controller 126. The video controller 126 drives a display 127. The video controller 126 is also connected to a video memory bus 128, but instead of being connected to separate video memory as in conventional systems, the video memory bus 128 is coupled instead to the shared memory bus 116. Two arbitration signal lines are connected between the video controller 126 and the host memory controller 114 in order to permit arbitration for control of the shared unified memory 118: a device request (dreq#) signal line from the video controller 126 to the host memory controller 114, and a device grant (dgnt#) signal line from the host memory controller 114 to the video controller 126.

For completeness, the system of FIG. 1 also shows a further I/O bridge 130 coupling the PCI bus 124 to a standard ISA bus 132.

Figure 2:
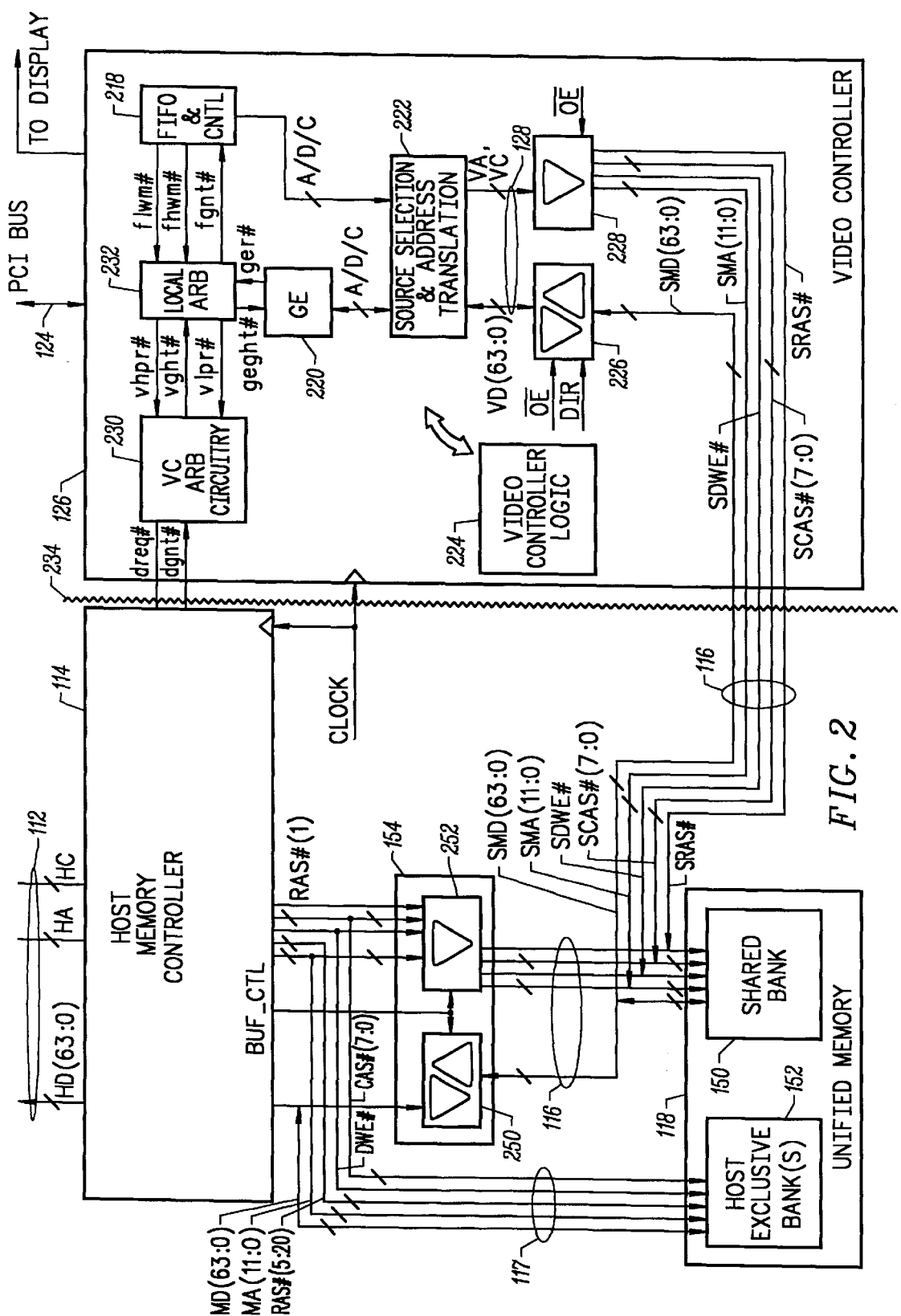
FIG. 2 is a symbolic block diagram illustrating the host memory controller with further details of the video controller, both of FIG. 1.
Figure 3:
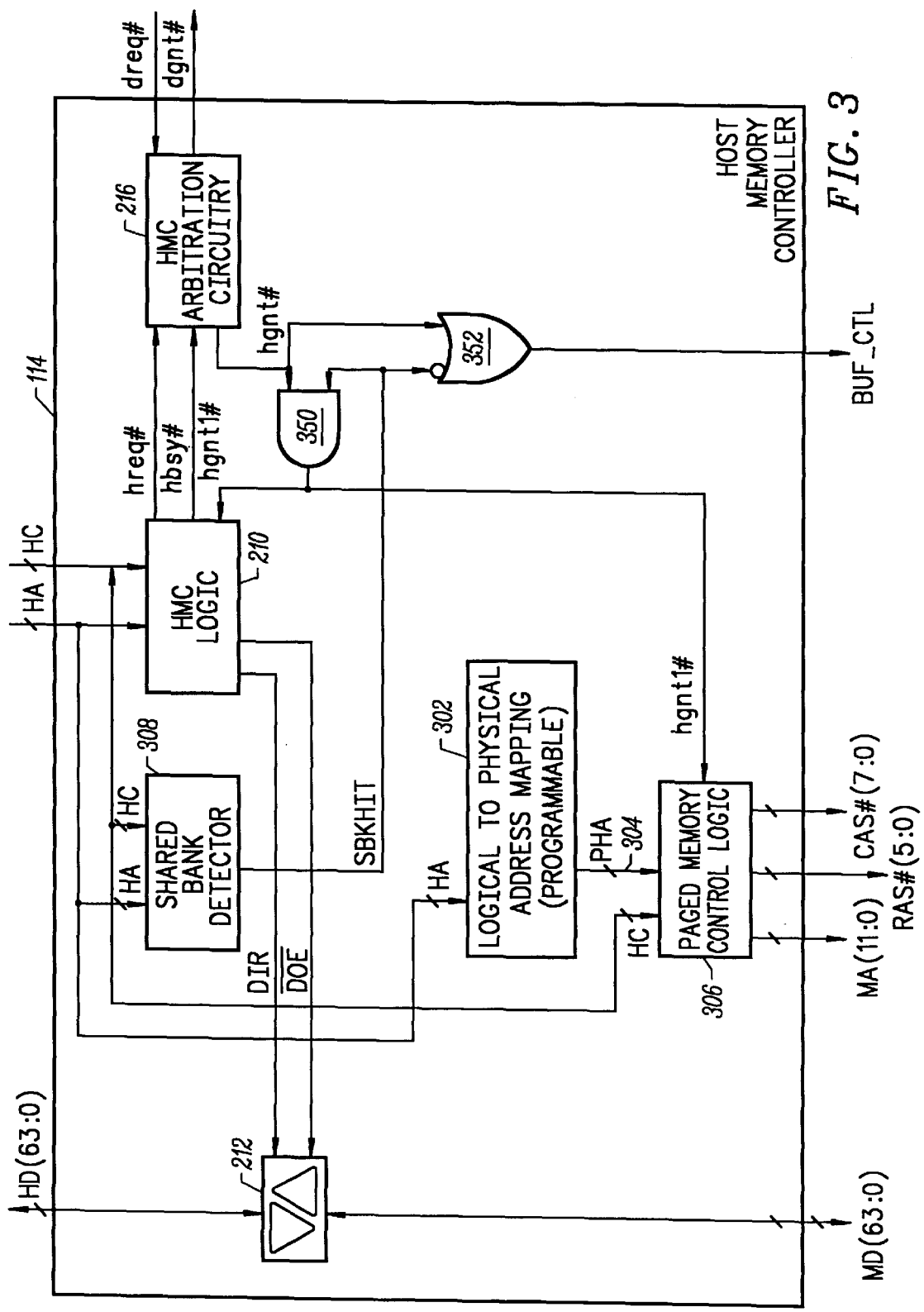
FIG. 3 is a symbolic block diagram of the host memory controller of FIG. 2.

FIG. 2 is a symbolic block diagram illustrating the host memory controller 114 with further details of video controller 126 (FIG. 1) and the buses 116 and 117. The host memory controller 114 is shown in more detail in FIG. 3. FIGS. 2 and 3 will be described together.

Host memory controller 114 includes, among other things not shown, HMC logic 210 coupled to receive the address and control signals from the host bus 112. The 64 host data bits from the host bus 112, HD(63:0), are connected to one side of a bi-directional buffer 212 in the host memory controller, the other side of which is connected to the 64-bit host memory data bus as MD(63:0). HMC logic 210 controls the direction of buffer 212 with a DIR signal, and controls the output enable with a $\overline{\text{DOE}}$ signal.

HMC logic 210 also drives a 12-bit memory address bus MA(11:0), and control signals including RAS#(5:0), CAS# (7:0) and DWE#(data write enable). Each of the signals RAS#(5:0) is provided for a different bank of the unified memory 118, so in a two-bank system, only RAS#(1:0) are used: RAS#(0) operates the host exclusive bank 0, and RAS#(1) operates the shared bank 1. In a system with more than two banks of unified memory 118, the higher numbered banks and higher numbered RAS#lines are added to the host exclusive portion of the unified memory 118. For consistency of board layout, RAS#(1) remains dedicated to the shared bank, regardless of how many banks are present in the system. It will be seen below that through address mapping circuitry in the HMC logic 210, the bank which is controlled by RAS#(1) is always mapped to the highest physical addresses in the system. It will also be appreciated that other mappings can be used in different embodiments. For example, in one embodiment, RAS#(0) is always dedicated to the shared bank of unified memory. In another embodiment, RAS#(5) is always dedicated to the shared bank of unified memory.

The memory data bus (MD(63:0)), the memory address bus (MA(11:0)), and the signals RAS#(5:2,0), DWE# and CAS#(7:0), form the host memory bus 117 (FIG. 1) and are connected to the host exclusive bank(s) 152 of unified memory 118. With the exception of RAS#(5:2,0), these signals are also connected to one side of a gate 154, the other side of which forms the shared memory bus 116 and is connected to the shared bank 150 of unified memory 118. The gate 154 receives RAS#(1) only, instead of RAS#(5:2, 0). The gate 154 can be made up of standard TTL buffers, in which case the data bus MD(63:0) communicates through a bi-directional buffer 250 controlled by HMC logic 210, and all other signals communicate through a uni-directional buffer 252 controlled by HMC logic 210. In this case, an additional wait state may be required for host memory accesses which are directed to addresses within the shared bank 150. Preferably, however, all of the communication between host memory bus 117 and shared memory bus 116 passes through bus switches such as part number QS32245 made by Quality Semiconductor, Inc., Sunnyvale, Calif. The insertion delay introduced by such bus switches is on the order of a single nanosecond, and therefore should not require added wait states in most systems. The control input for the bus switches 250 and 252 is connected to a signal BUF_CTL signal driven by HMC logic 210 in a manner described hereinafter.

The shared memory bus 116 includes the shared memory data bus SMD(63:0), a shared memory address bus SMA (11:0), and control signals SDWE#, SCAS#(7:0) and SRAS#. These are all connected to the shared bank 150 of unified memory 118.

Referring again to FIG. 3, the host memory controller 114 also includes HMC arbitration circuitry 216, for arbitrating for control of the shared bank 150 of unified memory 118 when needed. Arbitration is not required for host accesses to the host exclusive bank 152. HMC logic 210 drives two signals, hreq# and hbsy#, to HMC arbitration circuitry 216 to indicate the status of the host memory controller's utilization of the shared bank 150 of unified memory 118. When host memory controller 114 does not have control of the shared bank 150, the HMC logic 210 asserts hreq# to request control. When it does have control of the shared bank 150, the HMC logic 210 asserts hreq# to indicate a desire to keep control. The signal hbsy#, which has meaning only while the host memory controller 114 has control of the shared bank 150, is asserted by HMC logic 210 to indicate that a bus cycle is actually taking place ("bus cycle indication"). HMC logic 210 is required to de-assert hbsy# for a minimum of one clock cycle at the end of each bus cycle. When the host memory controller 114 is to be granted control of the shared bank 150, HMC arbitration circuitry 216 asserts a host grant (hgnt#) signal to HMC logic 210. hgnt# is ANDed by AND gate 350 with an SBKHIT signal which, as will be seen below, is high when the HMC is arbitrating for control of the shared bank 150, and the result is provided to HMC logic 210 as hgnt1#. The HMC 114 proceeds with a memory access when hgnt1# is asserted (low).

In the host memory controller 114, the host bus address leads HA are connected to a programmable logical-to-physical address mapping circuit 302, which converts the logical addresses arriving on the host bus 112 to physical addresses on an internal PHA bus 304. The physical address on PHA bus 304 is connected to paged memory control logic 306, which also receives the host bus control signals HC. Paged memory control logic 306 converts the physical addresses on PHA bus 304 directly to row and column addresses for driving onto MA(11:0), and it also generates the RAS#5:0) and CAS#(7:0) signals. The high order bits of the physical address determine the bank to which the access is directed, and the paged memory control logic 306 controls RAS#(5:0) to select the appropriate bank. As mentioned, however, the bank which contains the highest addresses of physical memory is always controlled by RAS#(1) in the present embodiment.

The paged memory control logic 306 generates RAS# (5:0) and CAS#(7:0) with timing that is entirely conventional for accessing fast page mode DRAMs, EDO DRAMs, BEDO DRAMs or SDRAMs, for example as described in OPTi Inc., "82C556M/82C557M/82C558M Viper-M (Multimedia) Chipset, Preliminary Data Book", Rev. 1.0 (April 1995), incorporated herein by reference. However, paged memory control logic 306 also receives hgnt1#, which is negated while an arbitration is in process for control of the shared bank 150. When paged memory control logic 306 samples hgnt1# negated, it delays generation of its RAS# and CAS# outputs until it samples hgnt1# asserted.

Shared bank detector 308 is coupled to receive the logical address from the HA bus, as well as to receive control signals from HC. It outputs a signal SBKHIT which, when asserted high, indicates that the address is within shared bank 150. SBKHIT is connected to one input of AND gate 350, as previously mentioned, and is also connected to an inverting input of an OR gate 352. The other (noninverting) input of OR gate 352 is connected to receive hgnt# from HMC arbitration circuitry 216, and the output of OR gate 352 forms the BUF_CTL output of host memory controller 114.

Thus when a memory access appears on host bus 112, to an address which is within host exclusive memory bank 152, shared bank detector 308 negates SBKHIT. Paged memory control logic 306 therefore samples hgnt1# low, and proceeds with the access. The $BUF_{13}CTL$ output of OR gate 352 is also low, isolating the host-exclusive memory bus 117 from the shared memory bus 116.

When a memory access appears on host bus 112, to an address which is within the shared bank of memory, shared bank detector 308 asserts SBKHIT. hgnt1# therefore is negated to paged memory control logic 306 (if the host memory controller 114 does not already have control of the shared bank (i.e., if hgnt#=1), and BUF_CTL is also negated. HMC logic 210 asserts an hreq# signal to HMC arbitration circuitry 216 to request control of the shared bank 150, and waits until HMC arbitration circuitry 216 returns hgnt# asserted and AND gate 350 in turn returns hgnt1# asserted. At that time, paged memory control logic 306 samples hgnt1# asserted and proceeds with the memory access. hgnt# asserted also allows OR gate 352 to assert the BUF_CTL signal to the gates 154 to couple host memory bus 117 and shared memory bus 116 together. For reasons described below particular to the arbitration protocol of the present embodiment, HMC logic 210 also asserts hbsy# to HMC arbitration circuitry 216 whenever a host-bus-originated access is actually taking place.

To indicate a preemption request from the video controller 126, HMC arbitration circuitry 216 negates hgnt#. HMC logic 210 and paged memory control logic 306 therefore sample hgnt1# negated, and immediately abort any then-pending host access to the shared bank 150. Negation of hgnt# also causes OR gate 352 to negate BUF_CTL to once again isolate the buses. Alternatively, in another embodiment, host memory controller 114 could allow any then-pending host-bus access to shared bank 150 to complete before releasing the shared bus 116. Note that because the host memory bus 117 is isolated from the shared memory bus 116 when BUF_CTL is negated, any memory accesses on the host bus 112 which are directed to any of the host exclusive banks 152 of the unified memory 118 can take place concurrently with any accesses which the video controller 126 is making to the shared bank 150.

The logical-to-physical address mapping circuitry 302, as previously mentioned, is programmable by the host processor 110. Specifically, three quantities are programmable: total DRAM size (TD), end of shared memory (UME) (a portion of DRAM is re-mapped here), and the size of shared memory (UMSZ). In the present embodiment, UME can be programmed to take any value at integer multiples of 128 MB (i.e., A(31:27) are programmable). This programmability allows the video controller 126 to have a linear frame buffer (LFB) located in any area desired by the video driver and BIOS. In a typical implementation, UME is chosen to have a value at least as high as 40000000h (one GB) in the memory address space because this allows the LFB to be located above the maximum host system memory address (which is 768 MB), and therefore always located at the same address. This choice for UME also allows system software that performs its own memory sizing not to confuse LFB memory with physical memory.

The size of shared memory, UMSZ, is the size of the bank of memory which is to contain the physical memory allocated to the video controller. UMSZ is programmable to be 0.5 MB, 1.5 MB, 2.5 MB or 3 MB.

Given these programmable values, the memory space, as viewed by HMC 114 and as viewed by the video controller 126 is set forth in Table I below:

TABLE I

| Logical Address | Meaning (to HMC) | Meaning (to Video Controller) | Physical Address |
|---|---|---|---|
| 00000h to 9FFFFh | DRAM | X | 00000h to 9FFFFh |
| A0000h to BFFFFh | PCI | VGA frame buffer | A0000h to BFFFFh |
| C0000h to C7FFFh | PCI/DRAM (ROM shadow) | Video Controller BIOS | C0000h to C7777h |
| C8000h to FFFFFh | PCI/DRAM (ROM shadow) | X | C8000h to CFFFFh |
| 100000h to (TD−UMSZ) | DRAM | X | 100000h to (TD−UMSZ) |
| (TD−UMSZ) to (UME−UMSZ) | PCI | X | (TD−UMSZ) to (UME−UMSZ) |
| (UME−UMSZ) to UME | PCI (if no remap) or DRAM (if remapped) | Linear frame buffer | (DRAM Bank1 Ceiling − UMSZ) to DRAM Bank1 Ceiling |
| UME to FFFBFFFFh | PCI | X | UME to FFFBFFFFh |
| FFFC0000h to FFFC7FFFh | PCI | X | FFFC0000h to FFFC7FFFh |
| FFFC8000h to FFFFFFFFh | PCI (high ROM) | X | FFFC8000h to FFFFFFFFh |

The video controller may optionally remap the LFB area dually for the host processor 110 to access the same physical memory via the PCI-bus 124 and video controller 126. Such an area can be chosen from any area that is mapped in the PCI space by the host memory controller 114. Assuming that area is located at a non-linear frame buffer address (NLFB, NLFB≧UME), then the system memory map is as shown in Table II below:

TABLE II

| Logical Address | Meaning (to HMC) | Meaning (to Video Controller) | Physical Address |
|---|---|---|---|
| 00000h to 9FFFFh | DRAM | X | 00000h to 9FFFFh |
| A0000h to BFFFFh | PCI | VGA frame buffer | A0000h to BFFFFh |
| C0000h to C7FFFh | PCI/DRAM (ROM shadow) | Video Controller BIOS | C0000h to C7FFFh |
| C8000h to FFFFFh | PCI/DRAM (ROM shadow) | X | C8000h to FFFFFh |
| 100000h to (TD−UMSZ) | DRAM | X | 100000h to (TD−UMSZ) |
| (TD−UMSZ) to (UME−UMSZ) | PCI | X | (TD−UMSZ) to (UME−UMSZ) |
| (UME−UMSZ) to UME | PCI (if no remap) or DRAM | Linear frame buffer | (DRAM Bank1 Ceiling − UMSZ) to |

TABLE II-continued

| Logical Address | Meaning (to HMC) | Meaning (to Video Controller) | Physical Address |
|---|---|---|---|
| | (if remapped) | | DRAM Bank1 Ceiling |
| UME to NLFB | PCI | X | UME to NLFB |
| NLFB to (NLFB + UMSZ) | PCI | Alternate (e.g. non-linear) frame buffer | NLFB to (NLFB + UMSZ) |
| (NLFB + UMSZ) to FFFBFFFFh | PCI | X | (NLFB + UMSZ) to FFFBFFFFh |
| FFFC0000h to FFFC7FFFh | PCI | X | FFFC0000h to FFFC7FFFh |
| FFFC8000h to FFFFFFFFh | PCI (high ROM) | X | FFFC8000h to FFFFFFFFh |

Note that TD is programmed only in HMC 114. UME and UMSZ are programmed with matching values both in the HMC 114 and in the video controller 126, and NLFB is programmed only in the video controller 126. In the above tables, "X" indicates an area of memory which the video controller does not access.

Returning to FIG. 2, the video controller 126 includes, among other things, two primary elements: a FIFO 218 (including its control circuitry), and a graphics engine (GE) 220. The graphics engine 220 reads from and writes to the display memory portion of unified memory 118 (in shared bank 150) as necessary to follow various graphics commands received over the PCI bus 124, and the FIFO 218 reads data from the frame buffer portion of the unified memory 118 for output to the display 127 (FIG. 1).

The graphics engine 220 and the FIFO 218 communicate with a source selection and address translation unit 222, which selects between the two sources of address and control information based on a local arbitration which takes place in a local arbiter 232 in video controller logic 224. Source selection and address translation unit 222 also performs all necessary address modification from the video memory address space to the physical address space of the video memory in the unified memory 118. This translation can be programmed into the video controller 126 via I/O port addresses on the PCI bus 124.

Source selection and translation unit 222 is connected to the video data bus VD(63:0), which is coupled, via a bi-directional three-state buffer 226, to the shared memory data bus SMD(63:0). Similarly, the source selection and address translation unit 222 is also connected to the address and control lines of the video memory bus 128, which communicates via a threestate buffer 228 with the memory address and control leads of the shared memory 116. The output enables of buffers 226 and 228, and the direction of bi-directional buffer 226, are controlled by the video controller logic 224.

The video controller 126 also includes video controller (VC) arbitration circuitry 230, which receives a video high priority request (vhpr#) signal and a video low priority request (vlpr#) signal from local arbiter 232. When the video controller 126 is granted control of the unified memory 118, the VC arbitration circuitry 230 asserts a video grant (vgnt#) signal to the local arbiter 232.

The local arbiter 232 arbitrates between requests for access to the unified memory 118 from the FIFO 218 and the graphics engine 220. It receives a FIFO high water mark (fhwm#) signal and a FIFO low water mark (flwm#) signal from the FIFO 218, and a graphics engine request (ger#) signal from the graphics engine 220. When the video controller 126 is granted control of the unified memory 118, the local arbiter 232 asserts either a FIFO grant (fgnt#) signal to the FIFO 218, or a graphics engine grant (gegnt#) signal to the graphics engine 220. The specific arbitration algorithm used by the local arbiter 232 is unimportant for an understanding of the invention, except to note that both the FIFO high water mark signal and the graphics engine request signal result in a video low priority request (vlpr#) to the VC arbitration circuitry 230, whereas a FIFO low water mark signal results in a video high priority request (vhpr#) to the VC arbitration circuitry 230. Also note that in another embodiment, the arbitration that takes place in local arbiter 232 can cover other devices as well. For example, in addition to a FIFO and a graphics engine, such arbitration can also cover a device which performs memory accesses for the host 110 but for which neither the host 110 nor HMC 114 know how to map to appropriate video memory addresses.

The HMC arbitration circuitry 216 and the VC arbitration circuitry 230 communicate with each other via the two arbitration-related signal lines, dreq# and dgnt#. Specifically, when the video controller 126 desires control of the unified memory 118, in response to sampling either vhpr# or vlpr# asserted, VC arbitration circuitry 230 drives dreq# low to the HMC arbitration circuitry 216. When HMC arbitration circuitry 216 desires to grant control of the unified memory 118 to the video controller 126, HMC arbitration circuitry 216 asserts dgnt# to the VC arbitration circuitry 230. Both signals dreq# and dgnt# are updated and sampled synchronously with a common clock signal CLOCK. (It will be understood that another arbitration protocol can be used in a different embodiments including protocols using more than two signal lines.) The address leads SMA(11:0) of the shared memory bus 116 carry a multiplexed row/column address as set forth in Table III. (The address leads for the host exclusive bank(s) follow the same numbering scheme.)

TABLE III

| | SMA10 | SMA9 | SMA8 | SMA7 | SMA6 | SMA5 | SMA4 | SMA3 | SMA2 | SMA1 | SMA0 |
|---|---|---|---|---|---|---|---|---|---|---|---|
| For Symmetric DRAMs and Asymmetric DRAMS x9 and x10 | | | | | | | | | | | |
| Col | — | 1 | A11 | A10 | A9 | A8 | A7 | A6 | A5 | A4 | A3 |
| Row | — | A21 | A20 | A19 | A18 | A17 | A16 | A15 | A14 | A13 | A12 |
| For Asymmetric DRAMs x8 | | | | | | | | | | | |
| Col | — | — | — | A10 | A9 | A8 | A7 | A6 | A5 | A4 | A3 |
| Row | A21 | A11 | A20 | A19 | A18 | A17 | A16 | A15 | A14 | A13 | A12 |

SMA(11) is not connected to the video controller 126. SMA(10:9) may be connected as indicated in Table III. When the video controller 126 has control of the unified memory 118, it remains the responsibility of the host memory controller 114 to drive SMA(11:9) high for one clock cycle and then tri-state the output drivers. SMA(11:9) have pull-up resistors (not shown) to keep them high when they are not being driven.

In a given embodiment, the SRAS#, SDWE# and SMA (8:0) signals can be externally buffered depending on the system requirements. If they are, then the buffer delay should be taken into account in the design of the DRAM interface in the video controller 126. Also, the outputs pins which drive these signal lines can be made programmable for low drive strength when an external buffer is present, and high drive strength when no external buffer is present. Note that SCAS#(7:0) are not buffered externally because of the typically tight timing requirements for these signals.

Whenever the host memory controller 114 controls the shared bank 150, the host memory controller 114 asserts BUF_CTL and drives all of the shared signals to the shared bank 150. When the HMC arbitration circuitry 216 asserts dgnt# to relinquish the memory to the video controller 126, the HMC 114 at the same clock edge transitions all shared signals to a high impedance state and negates BUF_CTL. However, the host memory controller 114 will ensure that SMA(11:9), SCAS#(7:0) and SDWE# are all driven high for a minimum of one clock cycle, and SRAS# is driven high for a minimum of two clock cycles, before this occurs.

The video controller 126 begins driving all of the shared signals immediately after the clock edge in which it samples dgnt# asserted in response to the video controller's request. Accordingly, one clock cycle of switchover time from the host memory controller 114 to the video controller 126 is guaranteed. Thereafter, the video controller 126 drives all of the shared signals as long as it continues to maintain dreq# low. When the video controller 126 releases the memory by bring dreq# high, the video controller 126 drives all of the shared signals to the high impedance state at the same clock edge. However, before doing so, the video controller 126 will ensure that SRAS#, SCAS#7:0) and SDWE# are driven high for a minimum of one clock cycle before driving them to the high impedance state. The host memory controller 114 asserts BUF_CTL and begins driving the shared signals immediately after the clock edge at which its samples dreq# high, thereby guaranteeing one clock cycle of switchover time from the video controller 126 to the host memory controller 114.

It will be appreciated that the earliest that the video controller can drive SRAS# low to start a memory access cycle is two clocks after dgnt# is asserted to release the memory to the video controller. Therefore, by requiring that the host memory controller 114 drive SRAS# high for a minimum of two clock cycles before asserting dgnt# and three-stating the shared signal lines, a four-clock-cycle-SRAS#-precharge time is guaranteed without the video controller 126 having to take any additional steps to ensure such a precharge time. Moreover, if the host memory controller 118 had not been accessing the shared bank of memory 118 immediately before releasing control of the memory to the video controller 126, the host memory controller 114 does not need to delay for any SRAS# precharge time before doing so because SRAS# has already been driven high for a while. This scheme therefore saves a few clock cycles of latency in the arbitration.

Similarly, after the video controller 126 brings dreq# high to release control of the memory to the host memory controller 114, the host memory controller 114 requires a minimum of three clock cycles before it can drive RAS# to start a host-originated memory access cycle to the shared bank of memory. Therefore, by requiring that the video controller drive SRAS# high for a minimum of one clock cycle before bringing dreq# high to return control of the memory 118 to the host memory controller 114, a minimum of four clock cycles of SRAS#-precharge time is guaranteed even though the immediately subsequent memory access by the host memory controller 114 is to the same shared bank of memory which had been accessed just previously by the video controller 126. The asymmetry between the pre-release SRAS# precharge times (two clock cycles required for HMC 114 but only one clock cycle required for video controller 126) is advantageous because in a typical embodiment, the HMC 114 has multiple memory banks to access whereas the video controller 126 accesses only one memory bank.

II. OPERATION OF THE SYSTEM

As previously explained, the host memory controller 114 always has control of the host exclusive bank(s) 152 of the unified memory 118. If it desires access to the shared bank(s) 150, it must engage in arbitration with the video controller 126. When the host memory controller 114 has control of the shared bank(s) 150, it has control of the entire unified memory 118. Conversely, when the video controller 126 desires to access video memory in the shared bank 150, it must arbitrate with the host memory controller 114 for control of the shared bank 150. When the video controller 126 does have control of the shared bank 150, it has control of only the shared bank 150; it cannot access the host exclusive bank(s) 152.

Under the arbitration protocol used in the present embodiment for control of the shared bank(s) 150, the default owner of the resource is the host memory controller 114. Ownership is transferred to the video controller 126 in response to a request therefor, and the video controller 126 returns ownership to the host memory controller 114 at the end of its activities, or in response to a preemption request by the host memory controller 114. The details of the arbitration mechanism used in the present embodiment will now be described.

A. Video Controller Arbitration Circuitry State Machine

Initially, note that in the state diagrams set forth herein, only the conditions which cause a transition from one state to another are marked. All other conditions will keep the state machine in its then-current state. For each of the state diagrams set forth herein, implementation in circuitry (using, for example, flip-flops or other synchronous circuits) or software, is entirely conventional Additionally, note that while state diagrams are a convenient way to represent the output sequences which are to be generated by a circuit in response to predefined input signal sequences, it will be understood that a different embodiment need not use the same states or state transitions as described herein for implementing the circuit. It is the sequence of output signals generated by the circuit in response to an input signal sequence which is important, not what internal states are defined and implemented for causing such sequences of output signals to take place.

Figure 4:
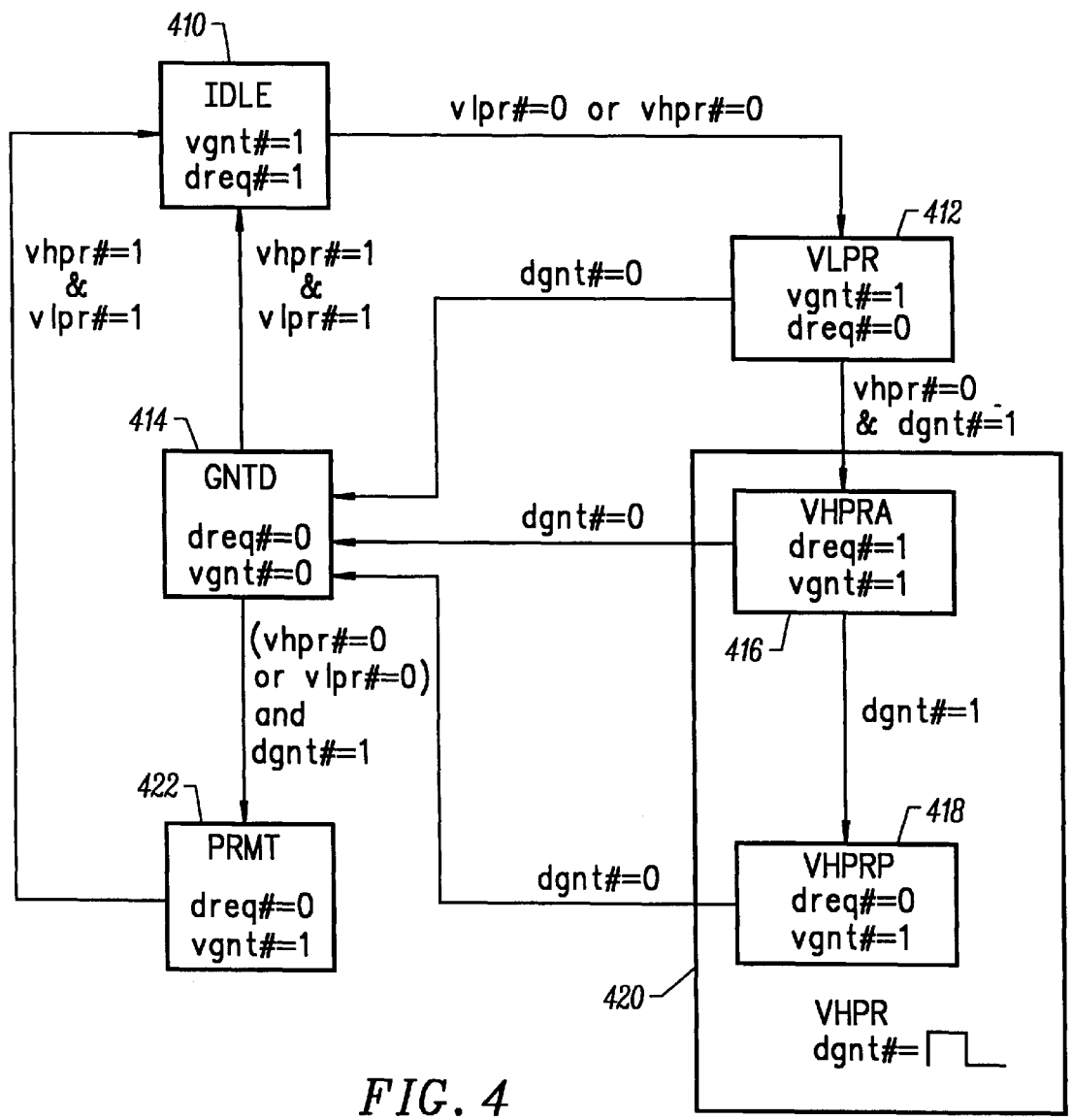
FIGS. 4–5 are state diagrams defining the operation of the arbitration protocol used in FIG. 2.

FIG. 4 illustrates the state machine followed by the VC arbitration circuitry 230. The state machine has six states as follows:

| | |
|---|---|
| IDLE | No request pending. |
| VLPR | Internal request has been asserted. |
| VHPRA | High priority request is being asserted. |
| VHPRP | High priority request is pending. |
| GNTD | Resource had been obtained. |
| PRMT | Preemption request from host memory controller received while the video controller had control of the resource. |

When the video controller does not require access to the shared memory bank 150, the state machine of FIG. 4 is in the IDLE state 410. In this state, the video controller arbitration circuitry 230 drives dreq# to the HMC arbitration circuitry 216, high.

When the local arbiter 232 asserts a request, either a low priority request using signal vlpr# or a high priority request using signal vhpr#, the state machine transitions to VLPR state 412. In this state, VC arbitration circuitry 230 brings dreq# low to assert a low priority request to the HMC arbitration circuitry 216. VC arbitration circuitry 230 continues to de-assert vgnt# to the local arbiter 232, since the video controller 126 has not yet been granted control of the shared memory.

If the request which caused the state machine to transition to VLPR state 412 was a low priority request (vlpr# asserted and vhpr# de-asserted), then the state machine remains in VLPR state 412 until either the VC arbitration circuitry 230 receives dgnt# asserted from the HMC arbitration circuitry 216, or the local arbiter 232 increases the priority level of the request by asserting vhpr# to the VC arbitration circuitry 230. In the former case (dgnt# asserted), the state machine transitions to GNTD state 414 in which the VC arbitration circuitry 230 asserts vgnt# to the local arbiter 232. At this time, the local arbiter 232 asserts either fgnt# to the FIFO 218 or gegnt# to the graphics engine 220, depending on system conditions and the protocol followed by the local arbiter 232 to arbitrate between the FIFO and the graphics engine. The VC arbitration circuitry 230 continues to maintain dreq# low to the HMC arbitration circuitry 216.

If the transition from IDLE state 410 to VLPR state 412 resulted from a high priority request from the local arbiter 232 (vhpr# asserted), and dgnt# remains de-asserted from HMC arbitration circuitry 216 in the next clock cycle, then the VC arbitration state machine of FIG. 4 transitions to the VHPRA high priority request asserted state 416. A transition to the VHPRA state 416 will occur also if the initial transition from IDLE state 410 to VLPR state 412 was due to a low priority request (vlpr# asserted) from the local arbiter 232, followed at a later time by assertion of a high priority request from the local arbiter 232 before the video controller has been granted control of the memory 118 (vhpr# asserted and dgnt# de-asserted).

In VHPRA state 416, the VC arbitration circuitry 230 continues to de-assert vgnt# to the local arbiter 232, but now brings dreq# high to the HMC arbitration circuitry 216. The state machine remains in VHPRA state 416 for only one clock cycle, transitioning to GNTD state 414 if control of the memory has been granted during that clock cycle (dgnt# asserted), or transitioning VHPRP state 418 if not (dgnt# de-asserted). In either case, the VC arbitration circuitry brings dreq# low when transitioning out of VHPRA state 416. Thus, regardless of whether the video controller 126 has been granted control of the memory while in VHPRA state 416, the VC arbitration circuitry 230 has effectively issued a one-clock-cycle-wide, high-going pulse on dreq# to the HMC arbitration circuitry 216. The HMC arbitration circuitry 216 recognizes such a pulse as incrementing the priority level of the video controller's request. It can be seen that VHPRA state 416 and VHPRP state 418 can be grouped together as two "substates" of a VHPR high priority request state 420; in such state, the VC arbitration circuitry 230 issues a one-clock-cycle-wide, high-going pulse on the dreq# signal to the HMC arbitration circuitry 216.

If the VC arbitration circuitry 230 reaches VHPRP state 418, then it remains in that state until dgnt# is asserted by the HMC arbitration circuitry 216. At that time, the state machine of FIG. 4 transitions to GNTD state 414.

While in GNTD state 414, as previously mentioned, vgnt# is asserted to the local arbiter 232 to allow the appropriate facilities of the video controller 126 to access the shared bank 150 of the unified memory 118. Also, the VC arbitration circuitry 230 maintains dreq# low to the HMC arbitration circuitry 216. When the video controller 126 no longer requires access to the shared memory, for example because flwm#, fhwm#, and ger# have all been de-asserted to the local arbiter 232, the local arbiter 232 desserts both vlpr# and vhpr# to the VC arbitration circuitry 230. In response, the state machine of FIG. 4 transitions back to IDLE state 410, in which it desserts vgnt# to the local arbiter 232 and brings dreq# high to the HMC arbitration circuitry 216. At this time the host memory controller 114 will again take control of the shared bank 150 of unified memory 118.

If, on the other hand, the host memory controller 114 requires access to the shared bank 150 while the VC arbitration circuitry 230 is in GNTD state 414, the host memory controller 114 de-asserts dgnt# to the video controller 126. In response to sampling dgnt# de-asserted with either vhpr# or vlpr# asserted, the VC arbitration circuitry 230 transitions to PRMT state 412. In this state, the VC arbitration circuitry 230 continues to maintain dreq# low, but at the same time it desserts vgnt# to the local arbiter 232. The local arbiter 232 determines for itself when the video controller 126 can release the shared bank 150, based on an algorithm the details of which are unimportant for an understanding of the broader aspects of the invention. It then desserts both vhpr# and vlpr# to the VC arbitration circuitry 230. In response, the state machine of FIG. 4 transitions to the IDLE state 410 and the shared bank 150 is released.

B. HKC Arbitration Circuitry State Machine

Figure 5:
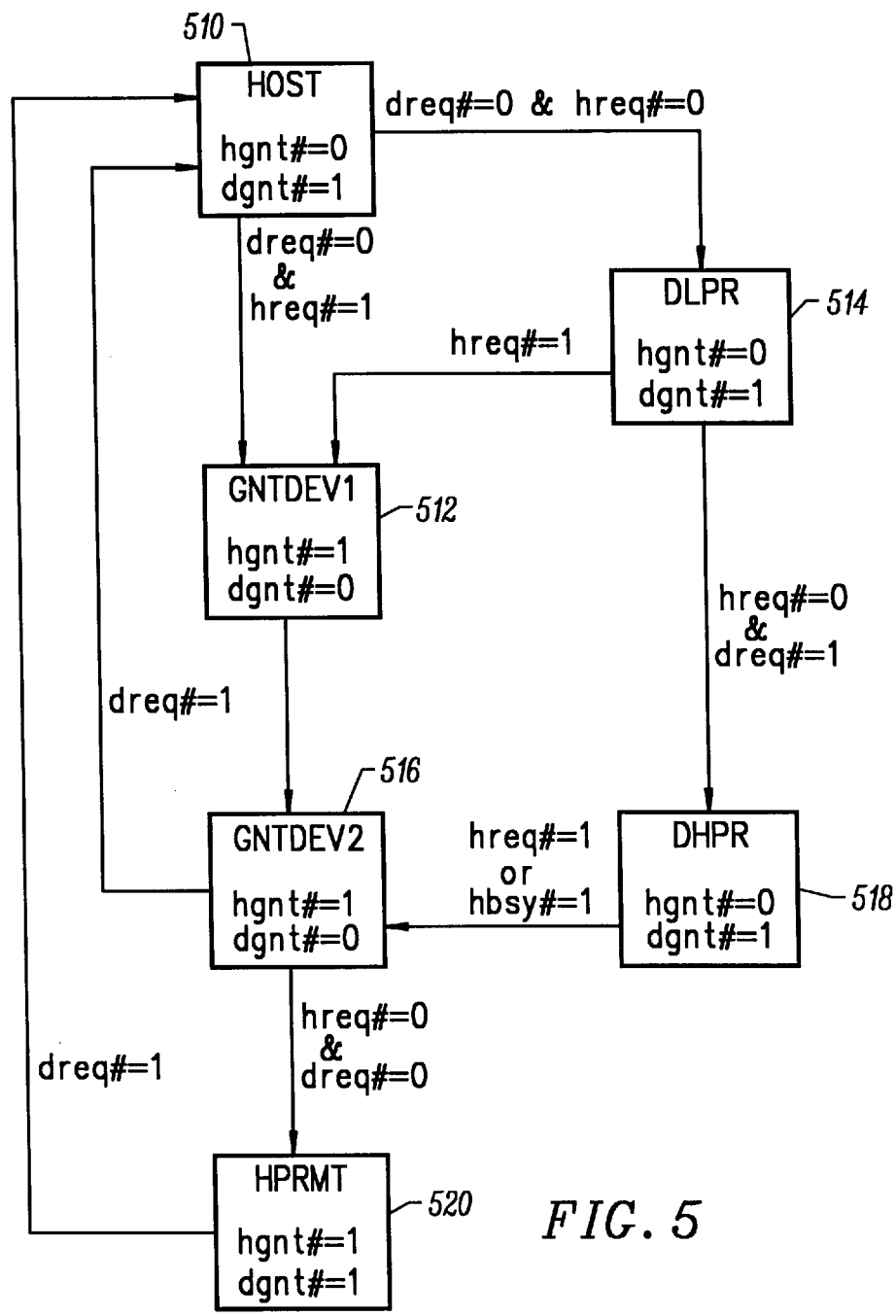

FIG. 5 is a state diagram illustrating an implementation of HMC arbitration circuitry 216 (FIG. 2) for implementing the invention. Of all the possible host states, only the major states pertinent to the invention are illustrated in FIG. 5. It will be appreciated that the states DLPR and DHPR can be implemented in a number of different ways, and therefore the time required by the HMC arbitration circuitry 216 to release the shared bank 150 may depend on other conditions which are not important in discussing the present invention.

The HMC arbitration circuitry state machine has six primary states as follows:

| | |
|---|---|
| HOST | This is the default state - - the shared bank 150 is parked with the host memory controller 114. The video controller may drive dreq# low while the HMC arbitration circuitry 216 is in this state. |
| DLPR | The host memory controller 114 has control of the shared bank 150 or it is in the process of being transferred to the video controller 126 to service a low priority request. |
| DHPR | The host memory controller 114 has control of the shared bank 150 or it is in the process of being transferred to the video controller 126 to service a high priority request. |
| GNTDEV1 | The video controller has control of the shared bank 150. This is an intermediate state to issue an early grant to the video controller in case of a high priority request. |
| GNTDEV2 | The video controller has control of the shared bank 150. The HMC arbitration circuitry 216 may de-assert dgnt# to signal a preemption request and make a transition to HPRMT state. |
| HPRMT | The video controller has control of the shared bank 150, and a preemption request from the HMC arbitration circuitry is pending. |

Referring to the state machine diagram of FIG. 5, the default state is HOST state 510. In this state, the host memory controller 114 has control of the shared bank 150 (in addition to host exclusive bank(s) 152). HMC arbitration circuitry 216 indicates as much by asserting hgnt# to HMC logic 210 and paged memory control logic 306 (via AND gate 350), and de-asserting dgnt# to the video controller 126.

If HMC arbitration circuitry 216 samples dreq# low from the video controller 126, while hreq# is de-asserted, the state machine transitions to FGNTDEV1 state 512. It shifts control of the shared bank 150 (but not the host exclusive bank 152) from HOST memory controller 114 to video controller 126 by asserting dgnt# and negating hgnt#.

If while in HOST state 510, the HMC arbitration circuitry 216 samples dreq# low with hreq# asserted, then HMC arbitration circuitry 216 transitions to DLPR state 514. As long as dreq# from the video controller 126 remains low, the HMC arbitration circuitry 216 will remain in DLPR state 514 until HMC logic 210 indicates, by negating hreq# to HMC arbitration circuitry 216, that it no longer requires control of the shared bank 150. At that time, HMC arbitration circuitry 216 transitions to the GNTDEV1 state 512 On the next clock cycle, HMC arbitration circuitry 216 transitions to GNTDEV2 state 516, retaining dgnt# asserted and hgnt# de-asserted.

If, while in DLPR state 514, HMC arbitration circuitry 216 samples dreq# high with hreq# still sampled asserted, then it transitions to DHPR high priority request state 518. As with DLPR state 514, in DHPR state 518, dgnt# remains de-asserted, hgnt# remains asserted, and hreq# sampled de-asserted will cause a transition to a granted state (in this case, GNTDEV2 state 516). However, in DHPR state 518, the machine will transition to the granted state also if HMC arbitration circuitry 216 samples hbsy# de-asserted from HMC logic 210. Thus, HMC arbitration circuitry 216 is likely to shift control of the shared bank 150 to the video controller 126 earlier from DHPR state 518 than from DLPR state 514.

Both GNTDEV1 state 512 and GNTDEV2 state 516 can be considered substates of a single GNTDEV state, since both substates assert dgnt# and de-assert hgnt#. They are represented as separate substates in the embodiment of FIG. 5 because otherwise the state machine can make a false transition to HOST state 510 when the video controller 126 attempts to raise the priority level by bringing dreq# high for the same clock edge that the HMC arbitration circuitry 216 is releasing control of the shared bank 150 by asserting dgnt#.

While in GNTDEV2 state 516, the video controller 126 can release the shared bank 150 by bringing dreq# high. In response, the state machine of FIG. 5 transitions back to HOST state 510, shifting control of the shared bank 150 back to the host memory controller 114. Alternatively, if the host memory controller 114 desires access to the shared bank 150, it asserts hreq# to the HMC arbitration circuitry 216. When HMC arbitration circuitry 216 samples hreq# asserted, with dreq# still low, it transitions to HPRMT host preemption state 520. In HPRMT state 520, the HMC arbitration circuitry 216 desserts dgnt# to the video controller 126, thereby requesting preemption. hgnt# remains de-asserted. In response to the preemption request, the video controller 126 will eventually release the shared bank 150 by bringing dreq# high, in response to which the HMC arbitration circuitry 216 transitions back to HOST state 510.

III. EXAMPLE SEQUENCES

Figure 6:
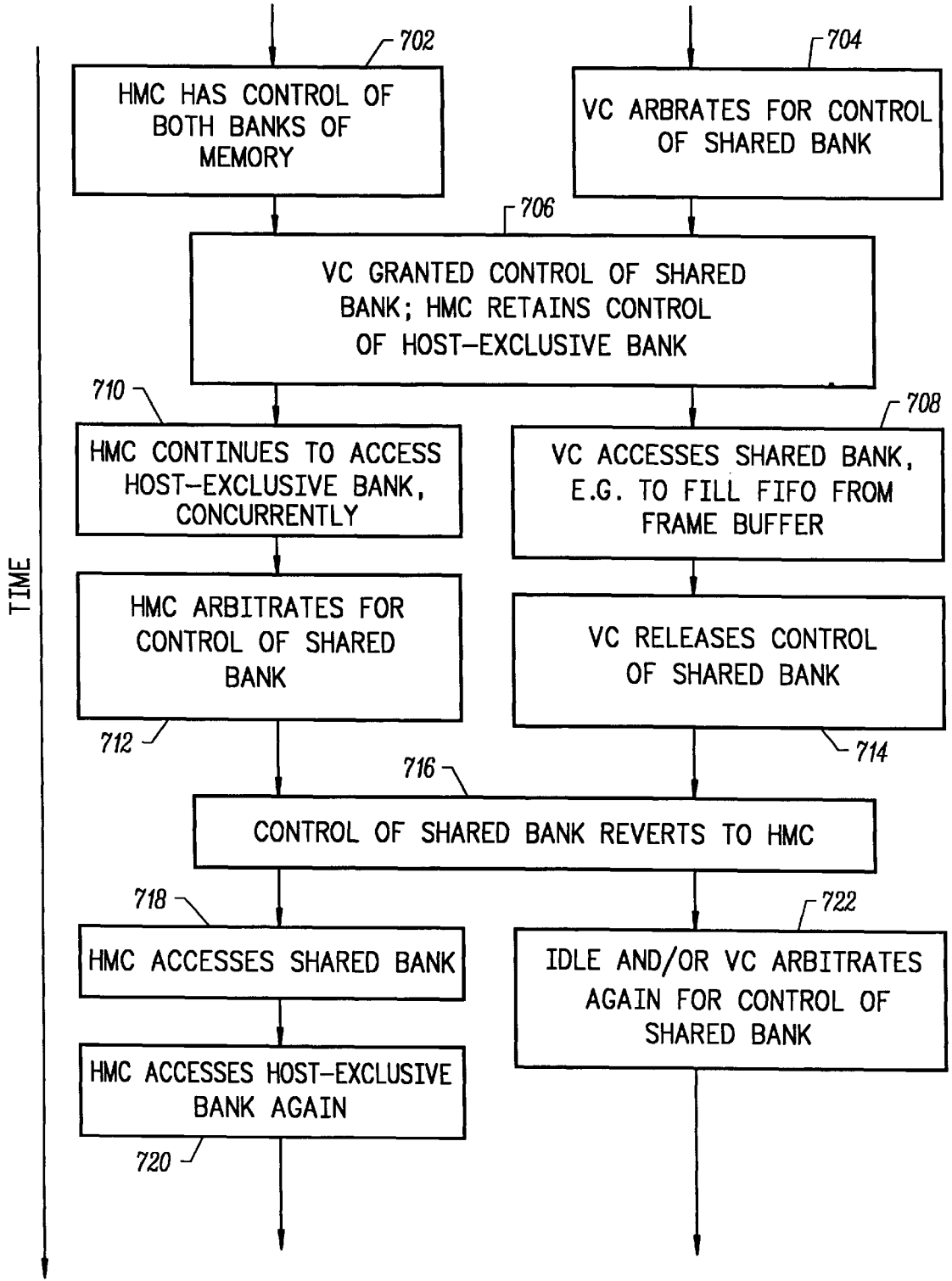
FIG. 6 is a flow diagram of an excerpt of system operation.

FIG. 6 is a flow diagram illustrating an excerpt of system flow for the system of FIG. 1. Beginning in step 702, it is assumed that the host memory controller 114 has control of both banks of the unified memory 118. In step 704, the video controller 126, perhaps because its video output FIFO has emptied to a low water mark, arbitrates for control of the shared bank 150 of the unified memory 118. In step 706, the video controller 126 is granted control of the shared bank 150. The host memory controller retains control of the host-exclusive bank 152.

In step 708, the video controller 126 accesses the shared bank 150, for example to fill the FIFO from a frame buffer in the shared bank 150. Concurrently, the host memory controller 114 continues to access the host-exclusive bank 152. As used herein, two accesses take place "concurrently" with each other as long as they overlap in time by even a small time period. The term as used herein does not require complete simultaneity of the two accesses.

At some later time, the host memory controller requires access to a memory location which is located physically in the shared bank 150, and therefore arbitrates for control of the shared bank in step 712. In response, after the arbitration, the video controller 126 releases control of the shared bank 150 in step 714. In step 716, control of the shared bank 150 reverts to the host memory controller 114.

In step 718, the host memory controller accesses the shared bank 150, performing the access for which the host memory controller 114 initiated the arbitration in step 712. The host memory controller 114 in fact continues to access the shared bank 150, interspersed as desired with accesses to the host-exclusive bank 152 (step 720), because the host memory controller 114 at this time has exclusive control of both banks of memory. As illustrated in step 722, the video controller is assumed to remain idle during the duration of steps 718 and 720, and/or the video controller 126 may arbitrate again for control of the shared bank 150.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. Computer system apparatus comprising:

a memory including first and second banks of memory;

a first device having a first data path to said first bank of memory;

a second device having a second data path to said second bank of memory;

a third data path coupling said first device to said second bank of memory, said third data path being enabled when said first device has control of said second bank of memory; and a memory controller, wherein said memory controller, in response to an access by said first device to a specified address, if said specified address is in said second bank of memory and said memory controller does not have control of said second bank of memory, performs said access to said second bank of memory only after arbitrating with at least said second device for control of said second bank of memory, and if said specified address is in said first bank of memory, performs said access to said first bank of memory without arbitrating with said second device for control of said first bank of memory, and wherein said memory controller disables said third data path when said memory controller is performing said access to said first bank of memory so that an additional access can be performed to said second bank of memory concurrently with said access to said first bank of memory.

2. Apparatus according to claim 1, wherein said first and second banks of memory have respective first and second physical address ranges, and wherein said second device comprises video output circuitry which repeatedly reads frame buffer data from said memory in said second physical address range for output as a video output signal.

3. Apparatus according to claim 2, wherein said first device comprises a host processor.

4. Apparatus according to claim 1, wherein said first and second banks of memory have respective first and second physical address ranges, said first and second physical address ranges being contiguous with each other.

5. Apparatus according to claim 4, wherein said second physical address range is above said first physical address range, and wherein said second device accesses said memory only in a proper subset of said second physical address range.

6. Apparatus according to claim 5, wherein said proper subset of said second physical address range occupies the highest addresses of said second physical address range.

7. Computer system apparatus comprising:

a memory including first and second banks of memory;

a host processor;

a host memory controller coupled to said host processor via a host bus, and coupled to said first bank of memory via a first memory bus;

a video controller having a video output and a first-in-first-out buffer for providing pixel information to said video output, said video controller being coupled to said second bank of memory via a second memory bus;

transmission circuitry having an enable input and coupled between said first and second memory buses, said transmission circuitry coupling said first and second memory buses together for unitary operation only when enabled; and arbitration circuitry coupled to said host memory controller, to said video controller and to said enable input of said transmission circuitry, said arbitration circuitry arbitrating among at least said host memory controller and said video controller for control of said second bank of memory, said arbitration circuitry enabling said transmission circuitry when control of said second bank of memory is granted to said host memory controller and disabling said transmission circuitry when control of said second bank of memory is granted to said video controller.

8. Apparatus according to claim 7, wherein each of said banks of memory has a respective RAS# input, wherein said video controller has a RAS# output coupled to the RAS# input of said second bank of memory, and wherein said host memory controller has a RAS# output corresponding to each of said banks of memory, the RAS# output of said host memory controller for said first bank of memory being coupled to the RAS# input of said first bank of memory and the RAS# output of said host memory controller for said second bank of memory being coupled to said second bank of memory only via said transmission circuitry.

9. A method for operating a computer system having first and second devices and further having a memory which includes at least first and second banks, comprising the steps of:

performing a first arbitration among at least said first and second devices for control of said second bank of memory;

granting control of said second bank of memory to said second device in response to said first arbitration;

said second device accessing said second bank of memory while said second device has control of said second bank of memory;

said first device accessing said first bank of memory also while said second device has control of said second bank of memory; and subsequently granting control of said first and second banks of memory together to said first device.

10. A method according to claim 9, further comprising the steps of:

after said step of granting control of said first and second banks of memory together to said first device, said second device releasing control of said second bank of memory; and after said step of said second device releasing control of said second bank of memory, said first device accessing said second bank of memory.

11. A method according to claim 10, further comprising the step of, after said step of said second device releasing control of said second bank of memory, said first device again accessing said first bank of memory.

12. A method according to claim 9, further comprising the steps of:

while said second device has control of said second bank of memory, performing a second arbitration among at least said first and second devices for control of said second bank of memory;

said second device releasing control of said second bank of memory in response to said second arbitration; and after said step of said second device releasing control of said second bank of memory, said first device accessing said second bank of memory.

13. A method according to claim 9, wherein said step of said second device accessing said second bank of memory comprises the step of reading a stream of frame buffer data from said second bank of memory, further comprising the steps of:

said second device filling a FIFO buffer with said frame buffer data, and said second device outputting said frame buffer data from said FIFO buffer as a video output signal.

14. A method according to claim 13, wherein said first device comprises a host processor.

15. A method for operating a computer system having a host processor and further having a memory which includes at least first and second banks, comprising the steps of:

in response to a first access by said host processor to a first specified address which is in said second bank of memory, while retaining control of said first bank of memory, arbitrating for control of said second bank of memory and performing said first access only after receiving control of said second bank of memory and while retaining control of said first bank of memory; and in response to a second access by said host processor to a second specified address which is in said first bank of memory, performing said second access without first arbitrating for control of said first bank of memory.

16. A method according to claim 15, wherein said step of performing said second access occurs while said host processor retains control of said second bank of memory.

17. A method according to claim 15, further comprising the step of releasing control of said second bank of memory prior to said step of performing said second access.

18. A method according to claim 15, wherein said step of performing said second access occurs without having control of said second bank of memory.

* * * * *